United States Patent
Jimbo et al.

(10) Patent No.: US 6,279,494 B1
(45) Date of Patent: Aug. 28, 2001

(54) METHOD AND APPARATUS FOR OPERATION CONTROL OF MELTING FURNACE

(75) Inventors: Hajime Jimbo, Chiba; Takeshi Kikuchi, Kanagawa; Toshirou Amemiya, Kanagawa; Yasuyuki Gohda, Kanagawa, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/424,038
(22) PCT Filed: May 29, 1998
(86) PCT No.: PCT/JP98/02375
§ 371 Date: Nov. 18, 1999
§ 102(e) Date: Nov. 18, 1999
(87) PCT Pub. No.: WO98/54514
PCT Pub. Date: Dec. 3, 1998

(30) Foreign Application Priority Data

May 29, 1997 (JP) .................................................. 9-154330

(51) Int. Cl.⁷ ....................................................... F23N 5/02
(52) U.S. Cl. ...................... 110/346; 110/341; 110/235; 110/190; 110/185
(58) Field of Search ...................... 110/185, 186, 110/190, 341, 346, 235, 101 CA, 101 C, 101 CF, 101 R; 266/87; 75/380

(56) References Cited

U.S. PATENT DOCUMENTS

| | | | |
|---|---|---|---|
| 4,254,338 | * 3/1981 | Abel et al. | 250/340 |
| 4,621,583 | * 11/1986 | Kaski | 110/346 |
| 4,953,477 | * 9/1990 | Martin | 110/190 |
| 5,100,111 | * 3/1992 | Thomas | 266/88 |
| 5,139,412 | * 8/1992 | Kychakoff et al. | 431/12 |
| 5,169,233 | * 12/1992 | Montgomery et al. | 374/124 |
| 5,368,471 | * 11/1994 | Kychakoff et al. | 431/12 |
| 5,493,578 | * 2/1996 | Fukusaki et al. | 373/8 |
| 5,544,597 | * 8/1996 | Camacho | 110/223 |
| 5,606,924 | * 3/1997 | Martin et al. | 110/341 |
| 5,762,682 | * 6/1998 | Rushe | 75/531 |
| 5,774,176 | * 6/1998 | Carter | 348/83 |
| 5,794,549 | * 9/1998 | Carter | 110/347 |
| 5,971,747 | * 10/1999 | Lemelson et al. | 431/12 |

FOREIGN PATENT DOCUMENTS 6-66641    3/1994  (JP) .
7-150227   6/1995  (JP) .

* cited by examiner

Primary Examiner—Denise L. Ferensic
Assistant Examiner—K. B. Rhinehart
(74) Attorney, Agent, or Firm—Wenderoth, Lind & Ponack, L.L.P.

(57) ABSTRACT

An operation control method and apparatus are provided for a melting furnace 1 having a supply opening 2 for incineration ash 6, a discharge opening 3 for molten slag 7, and a heat source 9 for applying an amount of heat to the supplied incineration ash. The method includes the steps of imaging the vicinity of the surface of molten slag 7 heated by an amount of heat transferred from the heat source with a television camera 5 to obtain an electronic image, differentiating a high-temperature region in the electronic image that is not lower than a predetermined temperature (1,300° C.) from a low-temperature region in the electronic image that is lower than the predetermined temperature, and controlling the amount of heat applied to the incineration ash from the heat source so that the size of the differentiated high-temperature region reaches a predetermined value. The television camera 5 has a relay lens 4 and is placed so that the surface portion of the molten slag 7, to which an amount of heat is transferred from the heat source 9, lies approximately in the center of the image.

23 Claims, 2 Drawing Sheets

METHOD AND APPARATUS FOR OPERATION CONTROL OF MELTING FURNACE

TECHNICAL FIELD

The present invention relates to an operation control method and apparatus for a melting furnace having a supply opening for incineration ash, a discharge opening for molten slag, and a heat source for applying an amount of heat to the supplied incineration ash.

BACKGROUND ART

To reduce the volume of incineration ash resulting from incineration of municipal refuse or the like and to make heavy metals contained in the ash insoluble or harmless, melt treatment of incineration ash, that is, a treatment in which incineration ash is melted at high temperature in a melting furnace and discharged from the melting furnace as molten slag, is carried out. In such a melting furnace, it is necessary, on the one hand, to raise the temperature in the melting furnace to a relatively high temperature, e.g. in the vicinity of 1,300° C., in order to melt incineration ash, and on the other, it is important to control the temperature so as not to exceed 1,300° C. with a view to minimizing damage to the furnace wall. Therefore, it is necessary to detect the temperature in the furnace continuously.

To measure the temperature in the melting furnace, a thermocouple has heretofore been used. However, the thermocouple detects the temperature of the gas in the furnace because it cannot directly measure the temperature of molten slag, which is at high temperature. The melt condition of molten slag in the furnace has heretofore been estimated from the temperature of the thermocouple and the condition of the molten slag, which is visually observed through a peep hole provided in the wall of the melting furnace. However, visual observation made from the access hole of the melting furnace through quartz glass involves problems. For example, because the size and shape of the access hole are limited, the visual field is narrow, and smoke in the furnace can adhere to the quartz glass. Therefore, the visual observation cannot accurately be performed.

DISCLOSURE OF INVENTION

An object of the present invention is to solve the above-described problems associated with melting furnaces and to detect the melt condition of molten slag in a melting furnace and control the amount of heat supplied to the melting furnace so that the temperature of the molten slag is within a predetermined range, thereby reducing the amount of heat consumed, obtaining favorable molten slag and minimizing damage to the melting furnace. Another object of the present invention is to automatically process an image of the inside of a melting furnace, thereby eliminating variations in the operation control of the melting furnace due to individual differences among operators. Still another object of the present invention is to enable the melt condition of molten slag in a melting furnace to be remotely monitored through a television camera at a position remote from the melting furnace, thereby improving the working environment of the furnace running operation.

The present invention provides an operation control method for a melting furnace having a supply opening for incineration ash, a discharge opening for molten slag, and a heat source for applying an amount of heat to the supplied incineration ash. The operation control method includes the steps of imaging the vicinity of the surface of molten slag heated by an amount of heat transferred from the heat source with a television camera to obtain an electronic image, differentiating a high-temperature region in the electronic image that is not lower than a predetermined temperature from a low-temperature region in the electronic image that is lower than the predetermined temperature, and controlling the amount of heat applied to the incineration ash from the heat source so that the size of the differentiated high-temperature region reaches a predetermined value. The step of controlling the amount of heat applied to the incineration ash from the heat source includes the step of supplying a reduced amount of heat to the incineration ash from the heat source when the size of the high-temperature region is not smaller than a predetermined size, and supplying an increased amount of heat to the incineration ash from the heat source when the size of the high-temperature region is smaller than the predetermined size.

The operation control method according to the present invention may preferably include the following features: (a) The predetermined temperature is about 1,300° C. (b) The step of differentiating a high-temperature region from a low-temperature region is carried out on the basis of a partial brightness of the electronic image. (c) The high-temperature region is an image portion having a brightness not less than a predetermined value, and the low-temperature region is an image portion having a brightness less than the predetermined value. (d) The step of differentiating a high-temperature region from a low-temperature region is determined by the chromaticity of the electronic image. (e) The high-temperature region is an image portion having a predetermined chromaticity, and the low-temperature region is an image portion not having the predetermined chromaticity. (f) The step of controlling the amount of heat applied to the incineration ash from the heat source is carried out such that either one of the amount of incineration ash supplied into the melting furnace and the total amount of heat applied to the incineration ash from the heat source is kept approximately constant per unit time, and the other is changed so that the size of the high-temperature region reaches the predetermined value. (g) The step of controlling the amount of heat applied to the incineration ash from the heat source includes the steps of generating a signal indicating an area ratio of the area of the high-temperature region to the area of the low-temperature region, and controlling the amount of heat applied to the incineration ash from the heat source on the basis of the signal indicating the area ratio.

The present invention provides an operation control apparatus for a melting furnace having a supply opening for incineration ash, a discharge opening for molten slag, and a heat source for applying an amount of heat to the supplied incineration ash. The operation control apparatus has a television camera placed to be able to image the vicinity of the surface of the molten slag, which is heated by the heat source, through an opening extending through a furnace wall near the ceiling of the melting furnace; a camera controller connected to the television camera to control the television camera so that a predetermined image signal is obtained with the television camera; a signal generator-indicator that processes the obtained image signal to differentiate a high-temperature region of the image that has a temperature not lower than a predetermined temperature from a low-temperature region of the image that has a temperature lower than the predetermined temperature, and generates a high-temperature region signal corresponding to the size of the high-temperature region; and a heat quantity controller that varies the amount of heat applied to the incineration ash from the heat source. The heat quantity controller varies the amount of heat applied to the incineration ash from the heat source so that the high-temperature region signal reaches a predetermined value.

The operational control apparatus according to the present invention may have the following structures: (h) The television camera has a relay lens. (i) The television camera is placed so that the surface portion of the molten slag, to which an amount of heat is transferred from the heat source, lies approximately in the center of the image. (j) The signal generator-indicator determines the high-temperature region and the low-temperature region by a partial brightness of the image or the chromaticity of the image. (k) the operation control apparatus further has an ash quantity measuring device that measures the amount of incineration ash supplied into the melting furnace per unit time and generates an incineration ash quality signal. (l) The heat quantity controller varies the amount of heat applied per unit quantity of incineration ash on the basis of a high-temperature region ratio signal. (m) The heat source, which applies an amount of heat to the incineration ash, is a transfer type plasma torch having a cylindrical cavity electrode and a graphite electrode in the bottom wall of the melting furnace. (n) The plasma torch is arranged such that air is supplied into the cavity of the cylindrical cavity electrode, and a voltage is applied between the cylindrical cavity electrode and the graphite electrode, whereby a plasma arc jet is emitted toward the top surface of molten ash from an opening below the cylindrical cavity.

EMBODIMENTS OF THE INVENTION

Figure 1:
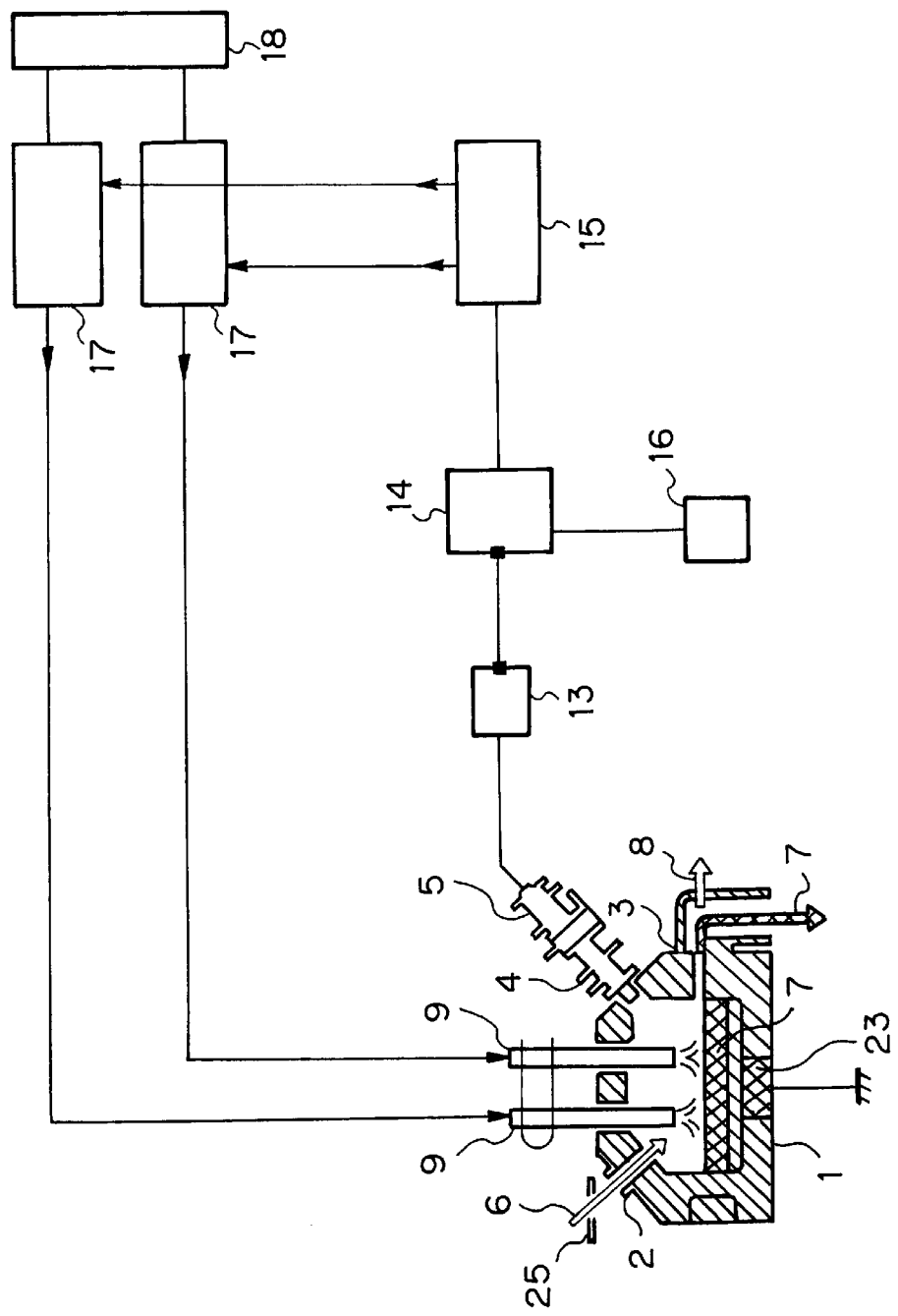
FIG. 1 is a diagram schematically showing the arrangement of the operation control apparatus according to the present invention.
Figure 2:
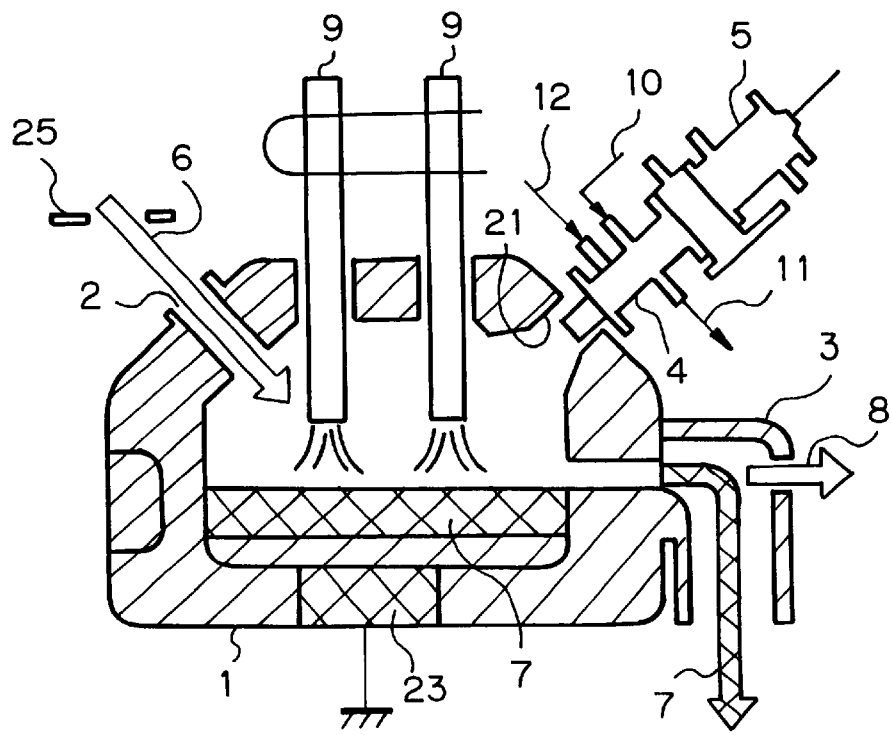
FIG. 2 is a sectional view schematically showing a melting furnace used in the present invention.

An embodiment of the present invention will be described with reference to the drawings. The arrangement of the operation control apparatus according to the present invention is schematically shown in FIG. 1. FIG. 2 is an enlarged sectional view of a melting furnace in FIG. 1. In FIGS. 1 and 2, the melting furnace 1 has a supply opening 2 for incineration ash, a discharge opening 3 for molten slag, an access hole 21, torches 9, and so forth. Incineration ash 6 containing incineration fly ash, which is supplied from the supply opening 2, floats over molten slag 7 in the melting furnace. While being caused to flow toward the discharge opening 3, the incineration ash 6 is heated with the torches 9 and thus successively melted into molten slag 7. As the amount thereof increases, the molten slag flows out and drops through the discharge opening 3 and is then sent to a slag-cooling device (not shown). Gas 8 generated in the melting furnace is discharged from the neighborhood of the discharge opening 3.

A relay lens 4 connected to a television camera 5 is placed in the access hole 21 of the melting furnace 1. As shown in FIG. 2, cooling water is allowed to flow from a cooling water inlet 10 into a cooling water jacket around the relay lens 4 and to flow out from a cooling water outlet 11. In addition, cooling air is supplied to the periphery of the relay lens 4 from a cooling air inlet 12. The cooling air cools the lens distal end to prevent the lens distal end from being raised in temperature by radiation heat from the inside of the furnace. The relay lens 4 can transmit an optical image of a relatively wide area in the furnace to the television camera 5 through the access hole 21, which has a small diameter and is long in the axial direction.

As shown in FIG. 1, the television camera 5 is connected to a camera controller 13, a computer 14 and a monitor 16. The computer 14 is connected to the camera controller and the monitor 16 and also connected to a heat quantity controller 15. The heat quantity controller 15 is connected to electric power supply devices 17 to control electric power supplied to the torches 9 from an electric power source 18 through the electric power supply devices 17.

Figure 3:
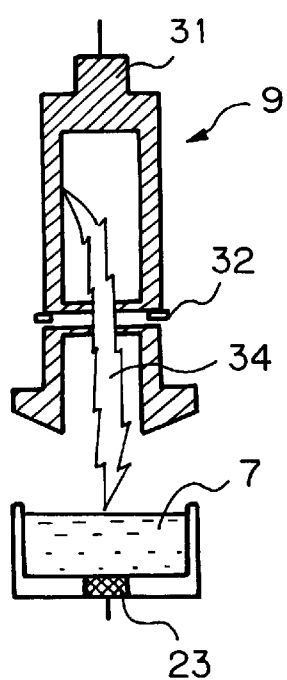
FIG. 3 is a sectional view schematically showing a transfer type plasma torch used in the present invention.

FIG. 3 is a sectional view schematically showing a transfer type plasma torch 9 used in the present invention. The transfer type plasma torch 9 has a cylindrical cavity electrode 31 and a graphite electrode 23 in the bottom wall of the melting furnace. An appropriate voltage is applied between the cavity electrode 31 and the graphite electrode 23, whereby a plasma arc jet 34 is emitted from an opening 32 below the cavity electrode 31 toward the top surface of the molten ash 7.

The television camera 5 is, as shown in FIG. 2, placed so as to be capable of imaging the vicinity of the liquid surface of the molten slag 7 through the opening 21 extending through a furnace wall near the ceiling of the melting furnace. The camera controller 13 is connected to the television camera 5 to control the television camera so that a predetermined image signal is obtained with the television camera. The television camera 5 converts an optical image obtained through the relay lens into an electronic image signal. The television camera 5 also generates an electronic image signal that differentiates a high-temperature region of the optical image that has a temperature not lower than a predetermined temperature, e.g. 1,300° C., from a low-temperature region having a temperature lower than the predetermined temperature. The electronic image signal from the television camera 5 is supplied to the monitor 16 through the computer 14 to display an electronic image on the monitor 16. On the monitor 16, the high-temperature region is displayed in the form of a relatively bright portion or a portion having a specific color.

The computer processes the electronic image signal to generate a high-temperature region signal corresponding to the size of the high-temperature region. In this embodiment, when the high-temperature region, which is not lower than a predetermined temperature, e.g. 1,300° C., is judged to be not smaller than a predetermined area from the brightness of the electronic image, the computer supplies a high-temperature region signal to the heat quantity controller 15 so that a reduced amount of heat is applied to the incineration ash from the heat source. When the high-temperature region, which is not lower than the predetermined temperature, is smaller than the predetermined area, the computer supplies a high-temperature region signal to the heat quantity controller 15 so that an increased amount of heat is applied to the incineration ash from the heat source.

According to the present invention, the surface of molten slag in a melting furnace, which melts incineration ash, is imaged with a television camera, and the image is processed to obtain the temperature of the molten slag. Then, the output of the heat source is controlled so that the temperature of the molten slag is within a temperature range. Therefore, it is possible according to the present invention to maintain the molten slag in an optimal temperature range and to obtain molten slag of good quality. In addition, the energy consumption can be minimized. According to the operation control apparatus of the present invention, a relay lens is used to enable the lens distal end to be inserted as far as a position near the inner wall of the melting furnace through an elongate access hole, thereby providing a widened visual field and thus allowing the condition of the molten slag to be accurately grasped.

What is claimed is:

1. An operation control method for a melting furnace having a supply opening for incineration ash, a discharge opening for molten slag, and a heat source for applying an amount of heat to supplied incineration ash, said operation control method comprising:
   imaging a vicinity of a surface of molten slag heated by an amount of heat transferred from the heat source with imaging means to obtain an image;
   differentiating a high-temperature region in said image that is not lower than a predetermined temperature from a low-temperature region in said image that is lower than the predetermined temperature; and
   controlling the amount of heat applied to the incineration ash from the heat source so that a size of said differentiated high-temperature region reaches a predetermined value;
   wherein said controlling the amount of heat applied to the incineration ash from the heat source includes supplying a reduced amount of heat to the incineration ash from the heat source when the size of said high-temperature region is not smaller than a predetermined size, and supplying an increased amount of heat to the incineration ash from the heat source when the size of said high-temperature region is smaller than the predetermined size, and said predetermined temperature is about 1,300° C.

2. An operation control method according to claim 1, wherein said imaging means comprises a television camera, said image comprises an electronic image, said differentiating a high-temperature region from a low-temperature region is carried out on a basis of a partial brightness of the electronic image, the high-temperature region is an image portion having a brightness not less than a predetermined value, and the low-temperature region is an image portion having a brightness less than the predetermined value.

3. An operation control method according to claim 1, wherein said imaging means comprises a television camera, said image comprises an electronic image, said differentiating a high-temperature region from a low-temperature region is determined by a chromaticity of the electronic image, the high-temperature region is an image portion having a predetermined chromaticity, and the low-temperature region is an image portion not having the predetermined chromaticity.

4. An operation control method according to claim 1, wherein said controlling the amount of heat applied to the incineration ash from the heat source so that a size of the differentiated high-temperature region reaches a predetermined value is carried out such that one of an amount of incineration ash supplied into the melting furnace and a total amount of heat applied to the incineration ash from said heat source is kept approximately constant per unit time, and the other of the amount of incineration ash supplied into the melting furnace and the total amount of heat applied to the incineration ash from said heat source is changed so that the size of said high-temperature region reaches the predetermined value.

5. An operation control method according to claim 1, wherein said incineration ash contains incineration fly ash, said controlling the amount of heat applied to the incineration ash from the heat source includes generating a signal indicating an area ratio of an area of said high temperature region to an area of the low-temperature region, and controlling the amount of heat applied to the incineration ash from the heat source on a basis of the signal indicating the area ratio.

6. An operation control method for a melting furnace having a supply opening for incineration ash, a discharge opening for molten slag, and a heat source for applying an amount of heat to supplied incineration ash, said operation control method comprising:
   imaging a vicinity of a surface of molten slag heated by an amount of heat transferred from the heat source with imaging means to obtain an image;
   differentiating a high-temperature region in said image that is not lower than a predetermined temperature from a low-temperature region in said image that is lower than the predetermined temperature; and
   controlling the amount of heat applied to the incineration ash from the heat source so that a size of said differentiated high-temperature region reaches a predetermined value;
   wherein said controlling the amount of heat applied to the incineration ash from the heat source so that a size of the differentiated high-temperature region reaches a predetermined value is carried out such that one of an amount of incineration ash supplied into the melting furnace and a total amount of heat applied to the incineration ash from said heat source is kept approximately constant per unit time, and the other of the amount of incineration ash supplied into the melting furnace and the total amount of heat applied to the incineration ash from said heat source is changed so that the size of said high-temperature region reaches the predetermined value.

7. An operation control method for a melting furnace having a supply opening for incineration ash, a discharge opening for molten slag, and a heat source for applying an amount of heat to supplied incineration ash, said operation control method comprising:
   imaging a vicinity of a surface of molten slag heated by an amount of heat transferred from the heat source with imaging means to obtain an image;
   differentiating a high-temperature region in said image that is not lower than a predetermined temperature from a low-temperature region in said image that is lower than the predetermined temperature; and
   controlling the amount of heat applied to the incineration ash from the heat source so that a size of said differentiated high-temperature region reaches a predetermined value;
   wherein said incineration ash contains incineration fly ash, said controlling the amount of heat applied to the incineration ash from the heat source includes generating a signal indicating an area ratio of an area of said high temperature region to an area of the low-temperature region, and controlling the amount of heat applied to the incineration ash from the heat source on a basis of the signal indicating the area ratio.

8. An operation control method for a melting furnace having a supply opening for incineration ash, a discharge opening for molten slag, and a heat source for applying an amount of heat to supplied incineration ash, said operation control method comprising:
   imaging a vicinity of a surface of molten slag heated by an amount of heat transferred from the heat source with a television camera to obtain an electronic image;

differentiating a high-temperature region in said electronic image that is not lower than a predetermined temperature from a low-temperature region in said electronic image that is lower than the predetermined temperature;

controlling the amount of heat applied to the incineration ash from the heat source so that a size of said differentiated high-temperature region reaches a predetermined value; and said predetermined temperature being about 1,300° C.;

wherein said step of differentiating a high-temperature region from a low-temperature region is determined by a chromaticity of the electronic image, the high-temperature region is an image portion having a predetermined chromaticity, and the low-temperature region is an image portion not having the predetermined chromaticity;

wherein said step of controlling the amount of heat applied to the incineration ash from the heat source so that a size of the differentiated high-temperature region reaches a predetermined value is carried out such that one of an amount of incineration ash supplied into the melting furnace and a total amount of heat applied to the incineration ash from said heat source is kept approximately constant per unit time, and the other of the amount of incineration ash supplied into the melting furnace and the total amount of heat applied to the incineration ash from said heat source is changed so that the size of said high-temperature region reaches the predetermined value.

9. An operation control method for a melting furnace having a supply opening for incineration ash, a discharge opening for molten slag, and a heat source for applying an amount of heat to supplied incineration ash, said operation control method comprising:

imaging a vicinity of a surface of molten slag heated by an amount of heat transferred from the heat source with a television camera to obtain an electronic image;

differentiating a high-temperature region in said electronic image that is not lower than a predetermined temperature from a low-temperature region in said electronic image that is lower than the predetermined temperature;

controlling the amount of heat applied to the incineration ash from the heat source so that a size of said differentiated high-temperature region reaches a predetermined value; and said predetermined temperature being about 1,300° C.;

wherein said step of differentiating a high-temperature region from a low-temperature region is carried out on a basis of a partial brightness of the electronic image; the high-temperature region is an image portion having a brightness not less than a predetermined value, and the low-temperature region is an image portion having a brightness less than the predetermined value;

wherein said step of controlling the amount of heat applied to the incineration ash from the heat source so that a size of the differentiated high-temperature region reaches a predetermined value is carried out such that one of an amount of incineration ash supplied into the melting furnace and a total amount of heat applied to the incineration ash from said heat source is kept approximately constant per unit time, and the other of the amount of incineration ash supplied into the melting furnace and the total amount of heat applied to the incineration ash from said heat source is changed so that the size of said high-temperature region reaches the predetermined value.

10. An operation control method for a melting furnace having a supply opening for incineration ash, a discharge opening for molten slag, and a heat source for applying an amount of heat to supplied incineration ash, said operation control method comprising:

imaging a vicinity of a surface of molten slag heated by an amount of heat transferred from the heat source with a television camera to obtain an electronic image;

differentiating a high-temperature region in said electronic image that is not lower than a predetermined temperature from a low-temperature region in said electronic image that is lower than the predetermined temperature;

controlling the amount of heat applied to the incineration ash from the heat source so that a size of said differentiated high-temperature region reaches a predetermined value; and said predetermined temperature being about 1,300° C;

wherein said step of differentiating a high-temperature region from a low-temperature region is determined by a chromaticity of the electronic image, the high-temperature region is an image portion having a predetermined chromaticity, and the low-temperature region is an image portion not having the predetermined chromaticity;

wherein said incineration ash contains incineration fly ash, said step of controlling the amount of heat applied to the incineration ash from the heat source includes generating a signal indicating an area ratio of an area of said high-temperature region to an area of the low-temperature region, and controlling the amount of heat applied to the incineration ash from the heat source on a basis of the signal indicating the area ratio.

11. An operation control method for a melting furnace having a supply opening for incineration ash, a discharge opening for molten slag, and a heat source for applying an amount of heat to supplied incineration ash, said operation control method comprising:

imaging a vicinity of a surface of molten slag heated by an amount of heat transferred from the heat source with a television camera to obtain an electronic image;

differentiating a high-temperature region in said electronic image that is not lower than a predetermined temperature from a low-temperature region in said electronic image that is lower than the predetermined temperature;

controlling the amount of heat applied to the incineration ash from the heat source so that a size of said differentiated high-temperature region reaches a predetermined value; and said predetermined temperature being about 1,300° C;

wherein said step of differentiating a high-temperature region from a low-temperature region is carried out on a basis of a partial brightness of the electronic image, the high-temperature region is an image portion having a brightness not less than a predetermined value, and the low-temperature region is an image portion having a brightness less than the predetermined value;

wherein said incineration ash contains incineration fly ash, said step of controlling the amount of heat applied to the incineration ash from the heat source includes generating a signal indicating an area ratio of an area of said high-temperature region to an area of the low-temperature region, and controlling the amount of heat applied to the incineration ash from the heat source on a basis of the signal indicating the area ratio.

12. An operation control apparatus for a melting furnace having a supply opening for incineration ash, a discharge opening for molten slag, and a heat source for applying an amount of heat to supplied incineration ash, said operation control apparatus comprising:

a television camera placed to be able to image a vicinity of a surface of the molten slag, which is heated by the heat source, through an opening extending through a furnace wall of the melting furnace;

a camera controller connected to the television camera to control the television camera so that a predetermined image signal is obtained with the television camera;

a signal generator-indicator that processes the obtained image signal to differentiate a high-temperature region of the image that has a temperature not lower than a predetermined temperature from a low-temperature region of the image that has a temperature lower than the predetermined temperature, and generates a high-temperature region signal corresponding to a size of the high-temperature region; and a heat quantity controller that varies the amount of heat applied to the incineration ash from the heat source so that the high-temperature region signal reaches a predetermined value;

wherein said signal generator-indicator determines the high-temperature region and the low temperature region by a partial brightness of the image or a chromaticity of the image;

wherein said opening extending through a furnace wall is an opening extending through a furnace wall near a ceiling of the melting furnace, and said incineration ash contains incineration fly ash.

13. An operation control apparatus according to claim 12, wherein said television camera has a relay lens and is placed so that a surface portion of the molten slag, to which an amount of heat is transferred from said heat source, lies approximately in a center of the image.

14. An operation control apparatus for a melting furnace having a supply opening for incineration ash, a discharge opening for molten slag, and a heat source for applying an amount of heat to supplied incineration ash, said operation control apparatus comprising:

a television camera placed to be able to image a vicinity of a surface of the molten slag, which is heated by the heat source, through an opening extending through a furnace wall of the melting furnace;

a camera controller connected to the television camera to control the television camera so that a predetermined image signal is obtained with the television camera;

a signal generator-indicator that processes the obtained image signal to differentiate a high-temperature region of the image that has a temperature not lower than a predetermined temperature from a low-temperature region of the image that has a temperature lower than the predetermined temperature, and generates a high-temperature region signal corresponding to a size of the high-temperature region;

a heat quantity controller that varies the amount of heat applied to the incineration ash from the heat source so that the high-temperature region signal reaches a predetermined value; and an ash quantity measuring device that measures an amount of incineration ash supplied to said melting furnace per unit time and generates an incineration ash quantity signal, wherein said heat quantity controller varies the amount of heat applied per unit quantity of incineration ash on a basis of a high-temperature region ratio signal.

15. An operation control apparatus according to claim 14, wherein said television camera has a relay lens and is placed so that a surface portion of the molten slag, to which an amount of heat is transferred from said heat source, lies approximately in a center of the image.

16. An operation control apparatus according to claim 15, wherein said opening extending through a furnace wall is an opening extending through a furnace wall near a ceiling of the melting furnace, and said incineration ash contains incineration fly ash.

17. An operation control apparatus according to claim 14, wherein said opening extending through a furnace wall is an opening extending through a furnace wall near a ceiling of the melting furnace, and said incineration ash contains incineration fly ash.

18. An operation control apparatus for a melting furnace having a supply opening for incineration ash, a discharge opening for molten slag, and a heat source for applying an amount of heat to supplied incineration ash, said operation control apparatus comprising:

a television camera placed to be able to image a vicinity of a surface of the molten slag, which is heated by the heat source, through an opening extending through a furnace wall of the melting furnace;

a camera controller connected to the television camera to control the television camera so that a predetermined image signal is obtained with the television camera;

a signal generator-indicator that processes the obtained image signal to differentiate a high-temperature region of the image that has a temperature not lower than a predetermined temperature from a low-temperature region of the image that has a temperature lower than the predetermined temperature, and generates a high-temperature region signal corresponding to a size of the high-temperature region; and a heat quantity controller that varies the amount of heat applied to the incineration ash from the heat source so that the high-temperature region signal reaches a predetermined value;

wherein said heat source, which applies an amount of heat to the incineration ash, is a transfer type plasma torch having a cylindrical cavity electrode and a graphite electrode in a bottom wall of the melting furnace, air is supplied into a cavity of the cylindrical cavity electrode, and a voltage is applied between the cylindrical cavity electrode and the graphite electrode, whereby a plasma arc jet is emitted toward a top surface of molten ash from an opening below the cylindrical cavity electrode.

19. An operation control apparatus according to claim 18, wherein said television camera has a relay lens and is placed so that a surface portion of the molten slag, to which an amount of heat is transferred from said heat source, lies approximately in a center of the image.

20. An operation control apparatus according to claim 19, wherein said imaging means comprises a television camera, said image comprises an electronic image, said differentiating a high-temperature region from a low-temperature region is carried out on a basis of a partial brightness of the electronic image, the high-temperature region is an image portion having a brightness not less than a predetermined value, and the low-temperature region is an image portion having a brightness less than the predetermined value.

21. An operation control apparatus according to claim 18, wherein said opening extending through a furnace wall is an opening extending through a furnace wall near a ceiling of the melting furnace, and said incineration ash contains incineration fly ash.

22. An operation control apparatus for a melting furnace having a supply opening for incineration ash, a discharge opening for molten slag, and a heat source for applying an amount of heat to supplied incineration ash, said operation control apparatus comprising:

a television camera placed to be able to image a vicinity of a surface of the molten slag, which is heated by the heat source, through an opening extending through a furnace wall of the melting furnace;

a camera controller connected to the television camera to control the television camera so that a predetermined image signal is obtained with the television camera;

a signal generator-indicator that processes the obtained image signal to differentiate a high-temperature region of the image that has a temperature not lower than a predetermined temperature from a low-temperature region of the image that has a temperature lower than the predetermined temperature, and generates a high-temperature region signal corresponding to a size of the high-temperature region; and a heat quantity controller that varies the amount of heat applied to the incineration ash from the heat source so that the high-temperature region signal reaches a predetermined value;

wherein said opening extending through a furnace wall is an opening extending through a furnace wall near a ceiling of the melting furnace, and said incineration ash contains incineration fly ash.

23. An operation control apparatus according to claim 22, wherein said television camera has a relay lens and is placed so that a surface portion of the molten slag, to which an amount of heat is transferred from said heat source, lies approximately in a center of the image.

* * * * *